United States Patent
Bonefeld

(10) Patent No.: US 8,295,954 B2
(45) Date of Patent: Oct. 23, 2012

(54) METHOD AND DEVICE FOR ADJUSTING A REGULATING DEVICE

(75) Inventor: Ralf Bonefeld, Aschaffeburg (DE)

(73) Assignee: Robert Bosch GmbH, Stuttgart (DE)

( * ) Notice: Subject to any disclaimer, the term of this patent is extended or adjusted under 35 U.S.C. 154(b) by 199 days.

(21) Appl. No.: 12/666,760

(22) PCT Filed: Jun. 27, 2008

(86) PCT No.: PCT/EP2008/005252
§ 371 (c)(1),
(2), (4) Date: Apr. 21, 2010

(87) PCT Pub. No.: WO2009/003643
PCT Pub. Date: Jan. 8, 2009

(65) Prior Publication Data
US 2010/0211194 A1  Aug. 19, 2010

(30) Foreign Application Priority Data

Jun. 29, 2007 (DE) .................. 10 2007 030 355
Feb. 26, 2008 (DE) .................. 10 2008 011 111

(51) Int. Cl.
*G06F 19/00* (2006.01)
*G01F 1/00* (2006.01)
(52) U.S. Cl. ............... 700/52; 702/50; 73/861
(58) Field of Classification Search ............ 700/28, 700/52; 318/560, 561; 702/50; 137/488; 73/861

See application file for complete search history.

(56) References Cited

U.S. PATENT DOCUMENTS

| 4,214,301 | A | 7/1980 | Iba et al. |
| 5,920,829 | A * | 7/1999 | Bretmersky et al. ........... 702/50 |
| 6,216,726 | B1 * | 4/2001 | Brown et al. ................. 137/486 |
| 7,073,392 | B2 * | 7/2006 | Lull et al. ....................... 73/861 |
| 7,499,515 | B1 * | 3/2009 | Beadle .......................... 375/358 |
| 7,769,493 | B2 * | 8/2010 | Elshafei et al. ............... 700/282 |
| 7,876,419 | B2 * | 1/2011 | Fujii et al. ....................... 355/53 |
| 2004/0074311 | A1 | 4/2004 | Lull et al. |
| 2004/0204885 | A1 * | 10/2004 | Wang et al. .................. 702/100 |
| 2006/0074569 | A1 * | 4/2006 | Burkhardt ...................... 702/50 |

* cited by examiner

*Primary Examiner* — Dave Robertson
(74) *Attorney, Agent, or Firm* — Michael J. Striker

(57) ABSTRACT

A method for adjusting a first functional unit (for example, a filter) and a second functional unit (for example, a proportional branch, integral branch, controlled industrial system and interference variables) includes determining a characteristic number that quantifies a relative deviation of respective reactions $Y_{Mod}$ and $y_{Sys}$ of the two functional units to a reference variable change that occurs when both functional units are excited by the same reference variable change and determining a correction factor based on the characteristic number and using the correction factor to adjust at least one of the two functional units in order to reduce the relative deviation.

20 Claims, 3 Drawing Sheets

METHOD AND DEVICE FOR ADJUSTING A REGULATING DEVICE

BACKGROUND OF THE INVENTION;

The invention involves a method for adjusting a first and a second functional unit of a regulating device and also involves the regulating device itself, on which the execution of the method is based.

Controlled systems with an integrated branch in the controller have structurally dictated overshoots in the guidance behavior. Such controlled systems are used, for example, in speed-controlled AC servomotors or also in pressure-controlled cylinder drive units. In order to reduce these overshoots, setpoint filters, for example, are used, which, depending on how they are parameterized, are able to influence the overshoots.

Designs of this kind, however have the disadvantage that with the filter delay, there is an additional controller parameter that must be tracked during operation since the peripheral circumstances (controlled system parameters) can change at any time.

SUMMARY OF THE INVENTION;

The object of the present invention is to disclose a regulating device, which can ensure an automatic tracking of additional control parameters, and a method by means of which an automatic tracking can be carried out.

The object is attained by means of a method and a regulating device as recited in the independent claims. The regulating device carries out an adjustment for at least two functional units included in the regulating device, which functional units can be configured by means of parameterizable eigenvalues; the regulating device includes a calculation means that determines a characteristic number, which quantifies the relative deviation between the reactions $y_{Mod}$ and $y_{Sys}$ of the two functional units to a reference variable change that occurs when both functional units are excited by the same reference variable change and which, based on the characteristic number, determines a correction factor that is used for parameterizing the functional units; a correction means is included to which the correction factor is supplied and which carries out a parameterization of the functional units in such a way that this reduces the relative deviation.

The method according to which the regulating device functions here is structured so that the characteristic number is determined in a first step. The characteristic number is determined based on the different responses of the two functional units to the occurrence of a reference variable change and quantifies a possible parameter deviation between the two functional units. The correction factor is determined in a second step based on this characteristic number; the correction factor is used to parameterize at least one of the two functional units and to reduce the relative deviation. The correction factor can relate to the filter time and/or to a controller amplification $K_P$. It produces a convergence of desired model behavior and system behavior. With a suitable parameterization of the functional units of the regulating device according to the invention, it is thus possible to reduce overshoots and to partially decouple the interference behavior of the system from guidance behavior.

The calculation means of the regulating device is embodied so that it is possible to determine a nondimensional correction factor and through the use of the correction means, to carry out an iterative change to an eigenvalue of at least one functional unit by means of the correction factor; the correction means continues to process correction values from the calculation means until the deviation essentially trends toward zero or, in accordance with a setpoint value, essentially corresponds to this setpoint value.

The advantage of this embodiment lies in the fact that the regulating device includes a self-regulating mechanism that is able to dynamically and adaptively carry out an optimization in that by means of the above-mentioned parameterization of the functional units, the control loop can be automatically adapted to new circumstances at any time. This mechanism could also be started in a non-automatic fashion, i.e. manually, for example in the mobile hydraulics in speed-controlled axes in construction machines, where either an automated control level is not present or automated axis movements for adjustment purposes are not admissible.

Preferably as part of a third process step, the adjustment is started by means of a signal derived from the reference variable change so that the adjustment can be easily automated. This could be implemented in such a way that the regulating device on which the invention is based includes a triggering means, which, based on a reference variable change, derives a signal that is supplied to the regulating device and triggers the start of the adjustment.

In a concrete embodiment, the first functional unit can be a setpoint filter implemented in the form of a low-pass filter in the integral branch of the regulating device and the second functional unit can be the system itself, which is to be regulated and is composed of at least one controller, a controlled system, and customary interference variables.

Because the signal at the filter output and the controlled variable of the real system are identical, if interference phenomena in the real system are infinitesimal, then the filter more or less represents an adjustable model of the system, with the adjustment being carried out by means of the method according to the invention. It is thus possible for controlled system variables such as inertias or hydraulic capacities to be derived from the behavior of the controlled system, in an automated or partially automated fashion under certain boundary conditions.

Preferably, each functional unit is preceded by an additional filter, with the respective filters having an identical filter characteristic and thus permitting the concerted reduction of interference influences. It is thus possible to filter $y_{Mod}$ and $Y_{Sys}$ before the characteristic number determination, thus reducing interference phenomena.

DETAILED DESCRIPTION OF THE INVENTION

Figure 1:
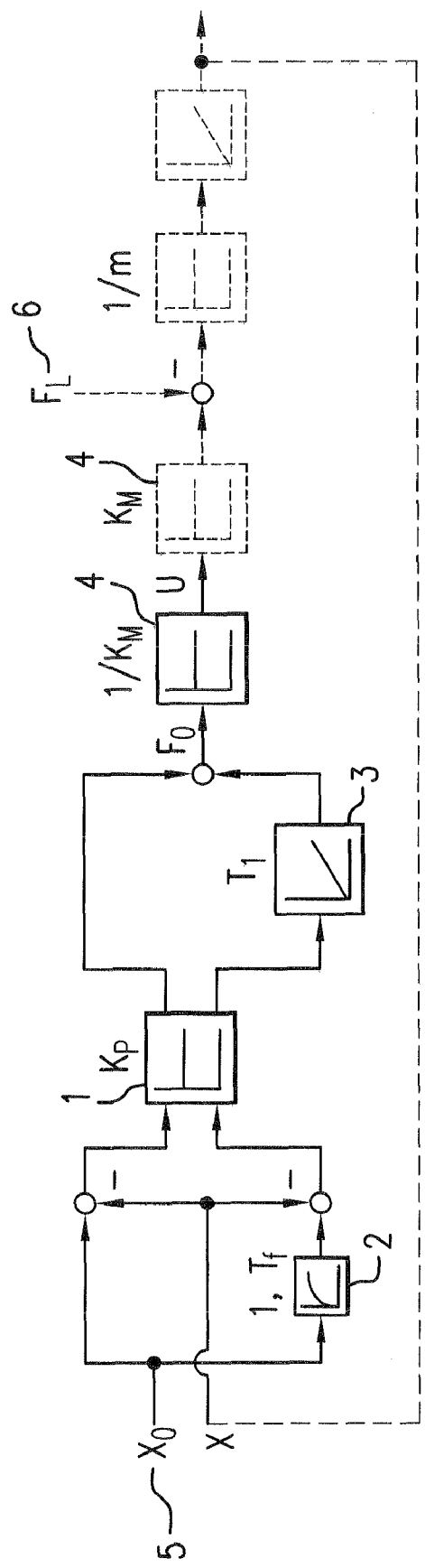
FIG. 1 depicts an embodiment of a PI controller and controlled system in accordance with the invention.

The error detection is based on the comparison values $y_{Mod}$ and $y_{Sys}$, where $y_{Mod}$ and $Y_{Sys}$ are the transient responses of the two functional units (filter/system in this case) when a change in the reference variable occurs over time. An error signal $E=y_{Mod}-y_{Sys}$ over a reference period $T_f$ is added up by means of integration. $T_f$ corresponds to an eigenvalue (sometimes the time constant in a PT1-element) by means of which it is possible to influence the transient response of at least one of the two functional units.

For the problem at hand, a weighting approach was selected, which is chiefly aimed at the robustness of the algorithm in the presence of interference influences. This involves the following considerations: interference phenomena act on only the real system and thus influence $y_{Sys}$. Interference influences, however, do not influence the model and thus the $y_{Mod}$. It is more certain that an error signal E is a result of the guidance signal, the greater the excitation of the system by means of the guidance signal because in that case, the amplitude of the interference variables is negligible.

In a system of the first order (PT1), the change of the output signal is a measure for the excitation since it reflects the deviation between the input and output signal in accordance with:

$$\dot{y}_{Mod} = \frac{1}{T_f} \cdot (x - y_{Mod}).$$

The error signal E is thus weighted with the value $\dot{y}_{Mod}$ because $\dot{y}_{Mod}$ changes proportionally to the intensity of the reference variable. The weighting of the error signal E through multiplication by the amount $\dot{y}_{Mod}$ ensures that errors are not weighted as long as no reference variable changes occur.

There is thus initially an integrated weighted error (IWE) available for the error evaluation, in accordance with:

$$IWE = \int_{T_0}^{T_0 + x \cdot T_f} |\dot{y}_{Mod}| \cdot (y_{Mod} - y_{Sys}) \cdot dt \text{ or} \quad (1)$$

$$IWE = \int_0^{T_{Ref}} |\dot{y}_{Mod}| \cdot (y_{Mod} - y_{Sys}) \cdot dt \quad (2)$$

each of which is a special error functional for determining dynamic parameter values of a control system on the basis of time series after excitation of the system. The difference between the two functionals lies in the fact that in functional (1), IWE is determined taking into account a freely selectable starting time T0, whereas in functional (2), IWE is determined taking into account the starting time T0=0. Functional (2) thus represents a special case of functional (1).

The disadvantage of functional (1) or (2) with regard to determining parameter value ratios is that they have a dimension $y^2$ and are thus disproportionately dependent on the level of the excitation. A nondimensional, excitation-independent parameter value can be achieved if the IWE functionals are related to a functional that is determined in an entirely similar fashion, but through the use of the system output parameters instead of the error E and through the use of the change speed of the system output instead of the model output, in accordance with $$\int_0^{T_{Ref}} |\dot{y}_{Sys} \cdot y_{Sys}| \cdot \text{sgn}(y_{Sys}) \cdot dt \text{ or} \quad (3)$$

$$\int_{T_0}^{T_0 + x \cdot T_f} |\dot{y}_{Sys} \cdot \Delta y_{Sys}| \cdot \text{sgn}(\Delta y_{Sys}) \cdot dt \text{ or} \quad (4)$$

$$\int_{T_0}^{T_0 + x \cdot T_f} \dot{y}_{Sys} \cdot \Delta y_{Sys} \cdot dt. \quad (5)$$

The signum function in scenarios (3) and (4) ensures that the direction of the error is independent of the direction of the excitation. Using the system response $Y_{Sys}$ to normalize the error functional also achieves a further stabilization in relation to interference phenomena. Using $\Delta y_{Sys} = y_{Sys} - y_{Sys}(t=T_0)$ in scenario (5) takes into account the cumulative state change of the system and using it in scenario (4) takes into account the total state change of the system. The normalization achieves the decoupling of the result from the form of excitation and level of excitation. The normalization with regard to the total state change gives less weight to the error in noisy signals, i.e. yields a good interference stability. The normalization with regard to the cumulative state change converges more quickly (discussed later).

On the whole, this yields the following alternative functionals for determining the characteristic number by means of which a characteristic number for corrections can be derived:

$$\text{characteristic number} = \frac{\int_{T_0}^{T_0 + x \cdot T_f} |\dot{y}_{Mod}| \cdot (y_{Mod} - y_{Sys}) \cdot dt}{\int_{T_0}^{T_0 + x \cdot T_f} |\dot{y}_{Sys} \cdot \Delta y_{Sys}| \cdot \text{sgn}(\Delta y_{Sys}) \cdot dt} \text{ or} \quad (6)$$

$$\text{characteristic number} = \frac{\int_{T_0}^{T_0 + x \cdot T_f} \dot{y}_{Mod} \cdot (y_{Mod} - y_{Sys}) \cdot dt}{\int_{T_0}^{T_0 + x \cdot T_f} \dot{y}_{Sys} \cdot \Delta y_{Sys} \cdot dt} \text{ or} \quad (7)$$

$$\text{characteristic number} = \frac{\int_0^{x \cdot T_f} |\dot{y}_{Mod}| \cdot (y_{Mod} - y_{Sys}) \cdot dt}{\int_0^{x \cdot T_f} |\dot{y}_{Sys} \cdot y_{Sys}| \cdot \text{sgn}(y_{Sys}) \cdot dt}, \quad (8)$$

where $y_{Mod}$ and $y_{Sys}$ represent the transient responses of the two functional units to a reference variable change, taken into account over time. The symbol $\dot{y}$ is the time derivative of y and $T_f$ is an eigenvalue, in particular the filter time constant of a low-pass filter, by means of which the transient response of at least one of the two functional units can be influenced. The letter x stands for a multiple of the eigenvalue, preferably for a value in the vicinity of 2*Pi, and the equation $\Delta y_{Sys} = y_{Sys} - y_{Sys}(t=T_0)$ applies, i.e. the system change between two points in time is now taken into account, where T0 is a freely selectable starting time in relation to which the current time point is considered.

This characteristic number is referred to as a relative integrated weighted error (RIWE).

To simplify the adjustment, a characteristic curve for the characteristic number is determined as a function of the ratio of the eigenvalues of the first and second functional unit, which characteristic curve is in particular at least partially linearized in the region in which the characteristic number trends toward zero. For this reason, the regulating device includes a means for deriving a characteristic curve for the characteristic number as a function of the eigenvalues of the functional units and preferably includes a storage means in which this characteristic curve is stored and to which the regulating device has access.

Figure 2:
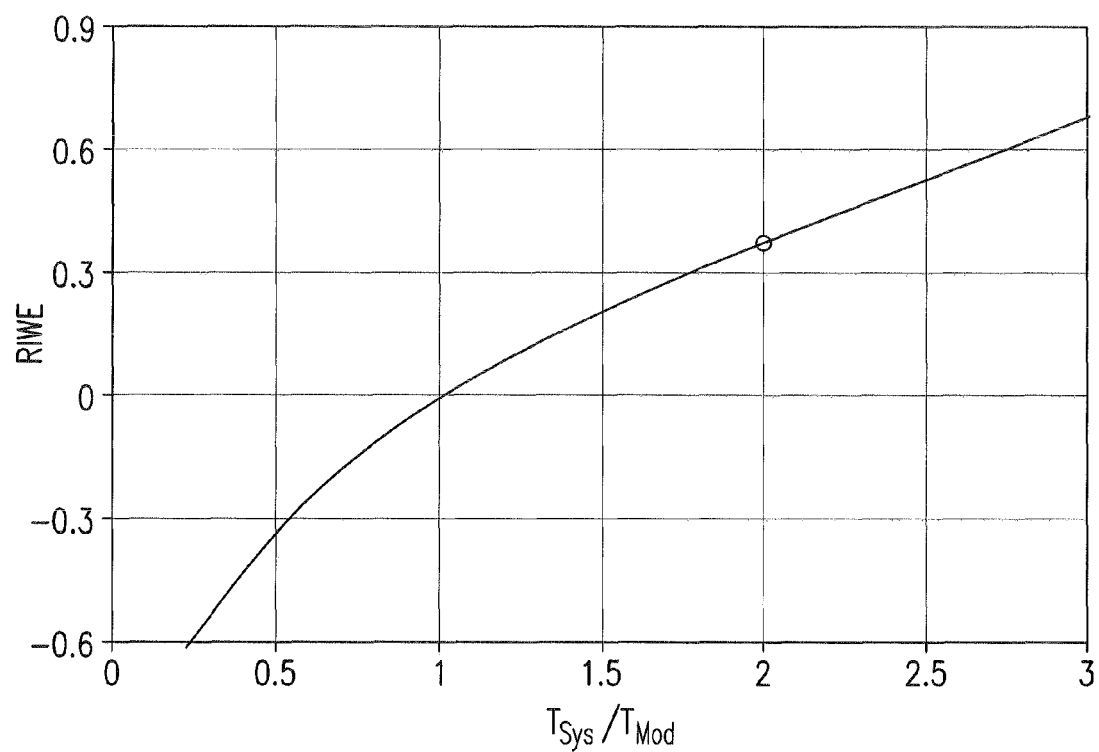
FIG. 2 depicts a characteristic curve of a regulating device of the invention.

FIG. 2 shows an example of such a characteristic curve.

The use of the RIWE functional in this case was based on two ideal systems of the first order. This yields a characteristic curve of the error functional as a function of the ratio of the time parameters $T_{Sys}/T_{Mod}$ of the compared systems.

The determination of the correction factor by means of the characteristic curve is then preferably carried out through successive approximation within a definite value range of the characteristic number and limitation of the characteristic number outside of this value range.

A rule for the correction estimate can, for example, be expressed as follows:

$$\left(\frac{T_{Mod}}{T_{Sys}}\right)_{Estimate} = \left\{\begin{array}{c} \text{lower value} \\ 1 + \text{slope} \cdot RIWE \\ \text{higher value} \end{array}\right\} \text{ for } \left\{\begin{array}{c} RIWE < \text{lower } RWIE\text{lim} \\ \text{lower } RWIE\text{lim} \leq RIWE \leq \text{upper } RIWE\text{lim} \\ RIWE > \text{upper } RIWE\text{lim} \end{array}\right\}$$

If RIWE falls below the lower RIWE limit, then $T_{Mod}/T_{Sys}$ is fixed at a lower value. If RIWE exceeds the upper RIWE limit, then $T_{Mod}/T_{Sys}$ is fixed at an upper value. Within the RIWE limits, a straight line with a definite slope is placed at the optimum value $T_{Mod}/T_{Sys}=1$, where in addition, RIWE=0. In this case, an error of zero occurs, i.e. the system and the model are balanced.

Using the procedure described below, in the event of deviations, the model and system parameters can be put through slight iterative changes until the model behavior and system behavior end up essentially identical. For this reason, the method preferably includes the following steps:

Association of the current characteristic number to interrelated eigenvalues of functional units by means of which the characteristic number was determined. In the above example, this would be $T_{Mod}/T_{Sys}$.

Determination of a correction factor by evaluation or by reading from the characteristic curve. In this case, a determination is made as to which change $T_{Mod}/T_{Sys}$ it must be subjected to in order to reduce RIWE.

Change of an eigenvalue ($T_{Mod}$ or $T_{Sys}$ in this case) of at least one functional unit by means of the correction factor.

The resulting change in the RIWE consequently yields a new change in the factor $T_{Mod}/T_{Sys}$. In another step, this new determination of the characteristic number RIWE is carried out through evaluation of the characteristic curve with the new ratio of $T_{Mod}/T_{Sys}$.

The above steps are repeated until the characteristic number essentially trends toward zero or, in accordance with a setpoint value, essentially corresponds to this setpoint value. The setpoint value is selected so that it yields a negligible error.

Figure 3:
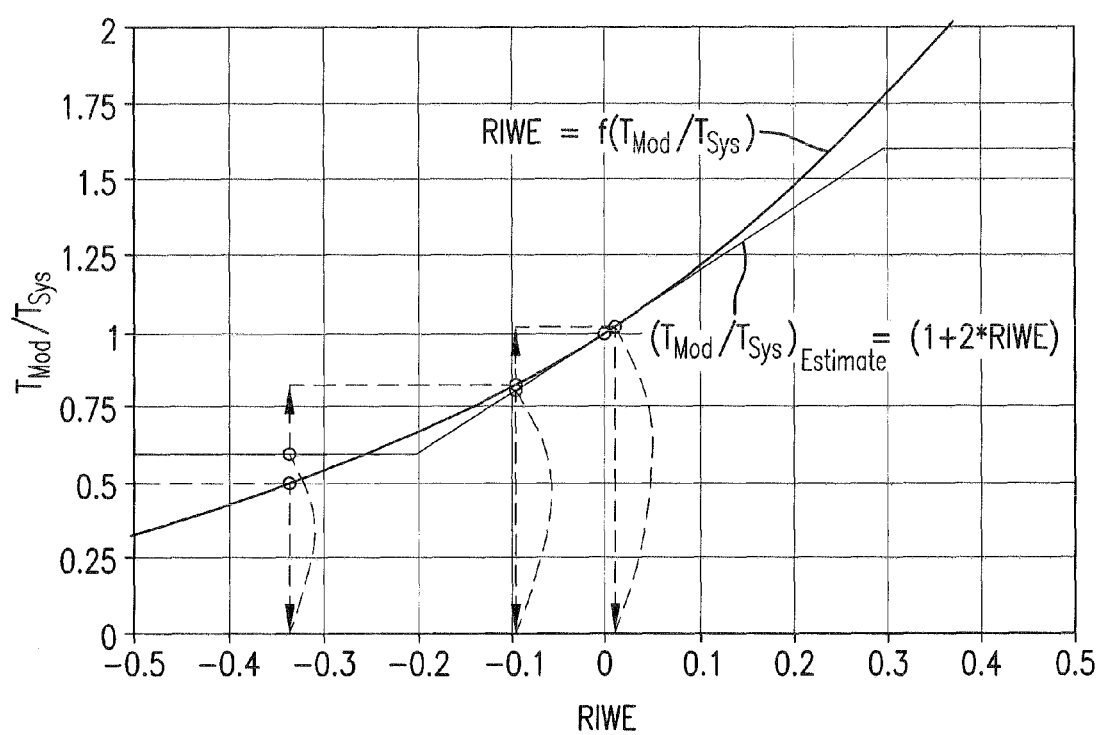
FIG. 3 depicts and inverse characteristic curve of the RIWE, according to the invention

The sequence of such an iteration is shown by way of example in FIG. 3. The graph depicts the inverse characteristic curve of RIWE, plotted over the quotients of $T_{Mod}/T_{Sys}$.

The curve was linearized by RIWE=0 and limited as follows:

$$\left(\frac{T_{Mod}}{T_{Sys}}\right)_{Estimate} = \left\{\begin{array}{c} 0.6 \\ 1 + 2 \cdot RIWE \\ 1.6 \end{array}\right\} \text{ for } \left\{\begin{array}{c} RIWE < -0.2 \\ -0.2 \leq RIWE \leq 0.3 \\ RIWE > 0.3 \end{array}\right\}$$

The method converges within a few steps. The fewer requirements that are placed on the magnitude of the deviation, the fewer iteration steps that are required.

The evaluation is carried out as described below (all numerical values given below are approximations):

RIWE is −0.33 at the start and $T_{Mod}/T_{Sys}$ is 0.5 at the start. Since $T_{Mod}/T_{Sys}$ lies outside the linearized region, a change to $T_{Mod}/T_{Sys}$, considered from the lower limit line (0,6), is carried out through modification of one or both parameters in a functional unit. This changes the quotient to $T_{Mod}/T_{Sys}=0.8$. In this case, based on the RIWE characteristic curve, an RWIE=−0.1 occurs, which already produces a massive error reduction in comparison to RIWE=−0.33. Since even the linearized region of the characteristic curve is relevant for the quotient $T_{Mod}/T_{Sys}=0.8$, $T_{Mod}/T_{Sys}$ is modified further starting from this characteristic curve, i.e. from this point forward, the RIWE characteristic curve is no longer taken into consideration. From the characteristic curves, it is now clear that for $T_{Mod}/T_{Sys}$, the factor of approximately 1 occurs, with RWIE in this case essentially trending toward zero. Thus in this case, it would only take a few iteration steps to eliminate the error for the most part. If necessary, further iteration steps can produce the approximation RIWE=0, depending on the desired level of precision. Depending on which of the counter functionals (3) to (5) is selected, quicker or more interference-stable results are achieved. As expectations with regard to the reduction of the RIWE rise, however, the number of iteration steps and therefore the computational complexity and time expenditure also increase.

Preferably, the third step described further above includes the following partial steps:
a) Determination of the system noise level during the adjustment,
b) Establishment of a threshold that lies above the system noise level,
c) Determination of the local maximum of the signal above the threshold,
d) Restart of the adjustment This makes it possible to derive a trigger signal from a reference variable change only if this trigger signal lies above the system noise level.

The beginning of the adjustment can thus be started without a separate start signal having to be generated on the control level. Thus a parameter adaptation is possible, for example, even in systems in which the guidance signal is produced manually. Let us take speed setpoint values in mobile work machines as an example. In this case, it is necessary to take into account arbitrary setpoint curves. As a trigger signal to be evaluated, it would be possible to select the second derivative ẍ of the reference variable x. This represents the lurch in the speed controller. It is thus possible, even in batch processing of position-controlled drive units (with limitation of lurching or acceleration), to generate a trigger signal immediately after the start of a batch.

The trigger algorithm can, for example, include the following steps:
Detection of a local maximum of ẍ (second derivative of the reference variable) according to the rule $ẍ_k < ẍ_{k-1} \wedge ẍ_{k-1} \geq ẍ_{k-2}$ and noting of the trigger value, where k−1 should represent the respective preceding value.
Resetting of the adjustment if a higher trigger value is detected during the run time.
Calculation of an average level of the trigger signal as an arithmetic average of the amount of all individual values over the adjustment period as a basis for a noise suppression.
Start of the evaluation if the trigger value exceeds X times the noise level of the preceding evaluation.

As an additional stabilization measure, the result of the evaluation is discarded if the change in the system output value over the entire evaluation period has a different sign than the change in the input value. This specifically indicates an excitation of the system by interference variables.

For these purposes, the triggering means of the regulating device according to the invention is embodied in such a way that it determines the system noise level during an adjustment, automatically establishes a threshold as a function of the determined system noise level, determines the local maximum of a signal derived from a reference variable change, and implements the start of the adjustment depending on the determined maximum.

Preferably, the regulating device of an electrically operated machine, in particular a speed-controlled drive unit, functions using the method according to the invention. In a speed-controlled drive unit, the denominator functional behaves in proportion to the sum of the amount of the kinetic power of the drive unit.

$$\int_0^{T_{Ref}} |\dot{y}_{Sys} \cdot y_{Sys}| \cdot \text{sgn}(y_{Sys}) \cdot dt = \int_0^{T_{Ref}} |a \cdot v| \cdot \text{sgn}(v) \cdot dt$$
$$= \int_0^{T_{Ref}} \frac{1}{m} |F_a \cdot v| \cdot \text{sgn}(v) \cdot dt$$
$$= \frac{1}{m} \int_0^{T_{Ref}} |P_a| \cdot \text{sgn}(v) \cdot dt$$

In this connection, it is possible to physically illustrate how the denominator functional increases the robustness of the total error functional: the added weighted deviation of the speeds of the model $y_{Mod}$ and the real drive unit $y_{Sys}$ is related to the total energy expended for changing the speed of the drive unit. This value also includes power values that occur due to interference forces. In other words, if interference phenomena occur during an analysis period, then the total functional RIWE becomes correspondingly smaller; the error is therefore given less weight. It is thus possible to identify the effective drive unit inertia. The parameter "a" stands for the acceleration, "F" stands for the force, "m" stands for the mass, "P" stands for the power, and "v" stands for the speed.

This also correspondingly applies to hydraulically operated machines, particularly for pressure-controlled and valve-controlled cylinders or speed-controlled and valve-controlled cylinder drive units. For example, it is also possible to identify the hydraulic capacity based on the measurement of pressure changes or volume changes.

The invention is also advantageous for the use of pneumatically operated machines or hybrid machines that make use of a plurality of the above-mentioned principles.

Preferably, the method according to the invention and the device according to the invention relate to systems of the first order in which a fully automatic or semiautomatic implementation is conceivable.

Other aspects of the invention ensue from the following description of the drawings. The drawings show a PI-controlled system that in principle has an overshooting guidance behavior. This has been prevented through the introduction of a setpoint filter into the integral branch of the controller. By taking into account the explanations given further above, the filter used can be viewed as a model of the system with a proportional controller.

On the basis of the time responses of the filter output and the controlled variable in a certain period after excitation by means of the setpoint value change, the method according to the invention determines a correction value that can be used for parameter correction so that the model behavior and system behavior conform to each other. This method enables controller adaptation and parameter identification.

FIG. 1 gives a detailed view of part of the signal flowchart of a PI controller, which includes a proportional branch 1, a filter 2, and an integral branch 3. The drawing also shows the controlled system 4, and interference variables 6. In this case, the integral branch of the controller has a low-pass filter of the first order for the setpoint value 5 inserted into it, which, with suitable parameterization of the delay time $T_f$, compensates for the zero point of the transfer function of the entire system. This measure has positive repercussions on the reaction speed both with regard to the guidance behavior and with regard to the reduction of the interference behavior. The PI control loop could also be cascaded with another control loop, e.g. a position controller for electrical servo axes.

The suitable filter parameterization for the example used here is:

$$T_f \stackrel{!}{=} T_M = \frac{1}{2 \cdot D \cdot \omega_0} = \frac{m}{d} = \frac{m}{K_P}$$

For the advantageous case of a parameterization of the filter in accordance with this equation, guidance behaviors of the filter (model) and system (control loop without filter) are identical. Since the filter behavior and the segment behavior do not deviate from each other, there is no control value in the I branch. The filter parameterization consequently achieves a minimization of the deviation between a model (filter) and the real system. Whether the minimization of the deviation in this case is achieved by adapting the model (filter parameterization) or the system (controller parameterization) is secondary in this context. In other words: in order to adjust system behavior and model behavior, in addition to adapting the time constant $T_f$ of the filter, it is also possible to revert to using the real response time $T_M$ of the speed-controlled drive unit or the changing of the controller amplification $K_P$. The method according to the invention solves the parameterization in a numerical fashion. The method could, for example, be implemented by means of a control integrated into the drive unit or by means of a regulation integrated into the drive unit or external to it. The adjustment could be used, for example, in the speed control or position control of a drive unit. Possible forms of excitation for simulating a reference variable change include jumps, ramps with speed and acceleration limitations for the positioning operation, and arbitrary setpoint value signals from an overriding controller cascade. Furthermore, a deactivation window can be implemented that prevents the adoption of a newly identified parameter if it diverges from the current parameter value by less than a percentage, which is to be determined, e.g. 0.5%.

SUMMARY OF THE SYMBOLS USED $\dot{x}$—speed setpoint value (reference variable)
$\dot{x}_o$—speed actual value
$F_o$—control variable
$F_L$—interference variable
$K_P$—amplification factor (proportional element)
$K_M$—torque constant
m—mass
$T_i$—integration element time constant
$T_f$—filter time constant (PT1)
$T_M$—system response time
U—voltage
$y_{Mod}$—system response of the model to a changing reference variable
$y_{Sys}$—system response of the control system to a changing reference variable
$\Delta y_{Sys}$—cumulative change in system response of the control system
$\dot{y}_{Mod}$—derivatives of the model system response
$\dot{y}_{Sys}$—derivatives of the control system response

What is claimed is:

1. A method for adjusting a first functional unit and a second functional unit of a regulating device, wherein the first functional unit embodies a filter (2) and the second functional unit comprises a proportional branch (1), an integral branch (3), a controlled industrial system (4) and interference variables (6), the method comprising steps of:

determining a characteristic number, which quantifies a relative deviation of respective reactions $y_{Mod}$ and $y_{Sys}$ of the two functional units to a reference variable change that occurs when both functional units are excited by the same reference variable change; and determining a correction factor based on the characteristic number and using the correction factor to adjust at least one of the two functional units in order to reduce the relative deviation;

wherein the characteristic number is determined in accordance with one of the following rules:

$$\text{characteristic number} = \frac{\int_{T_0}^{T_0+x \cdot T_f} |\dot{y}_{Mod}| \cdot (y_{Mod} - y_{Sys}) \cdot dt}{\int_{T_0}^{T_0+x \cdot T_f} |\dot{y}_{Sys} \cdot \Delta y_{Sys}| \cdot \text{sgn}(\Delta y_{Sys}) \cdot dt} \text{ or}$$

$$\text{characteristic number} = \frac{\int_{T_0}^{T_0+x \cdot T_f} \dot{y}_{Mod} \cdot (y_{Mod} - y_{Sys}) \cdot dt}{\int_{T_0}^{T_0+x \cdot T_f} \dot{y}_{Sys} \cdot \Delta y_{Sys} \cdot dt} \text{ or}$$

$$\text{characteristic number} = \frac{\int_{0}^{x \cdot T_f} |\dot{y}_{Mod}| \cdot (y_{Mod} - y_{Sys}) \cdot dt}{\int_{0}^{x \cdot T_f} |\dot{y}_{Sys} \cdot y_{Sys}| \cdot \text{sgn}(y_{Sys}) \cdot dt},$$

where $y_{Mod}$ and $y_{Sys}$ represent the transient responses of the two functional units to a reference variable change, taken into account over time, the symbol $\dot{y}$ is the time derivative of y, $T_f$ corresponds to an eigenvalue of the low-pass filter (2) that influences a transient response of at least one of the two functional units, x stands for a multiple of the eigenvalue and the equation $\Delta y_{Sys} = y_{Sys} - y_{Sys}(t=0)$ applies, where $T_0$ corresponds to a freely selectable starting time.

2. The method as recited in claim 1, wherein the step of determining the correction factor further includes deriving a signal from the reference variable change in order to start adjusting of the at least one of the two functional units.

3. The method as recited in claim 1, wherein the filter (2) is a low-pass filter of the first order, and the second functional unit (1, 3, 4, 6) is a controller.

4. The method as recited in claim 1, wherein $y_{Mod}$ and $Y_{Sys}$ are filtered by the filter (2) before the determining the characteristic number.

5. A method as recited in claim 1, wherein a characteristic curve for the characteristic number is determined as a function of the ratio of the eigenvalues of the first and second functional unit (1, 2, 3, 4, 6), which characteristic curve is at least partially linearized in a region of the characteristic curve in which the characteristic number trends toward zero.

6. The method as recited in claim 5, wherein the determining of the correction factor by means of the characteristic curve is carried out through successive approximation.

7. The method as recited in claim 6, further comprising:
a) associating a current characteristic number to eigenvalues of the first and second functional units (1, 2, 3, 4, 6);
b) determining the correction factor;
c) changing the eigenvalue of at least one of the first and seconds functional units using the correction factor,
d) redetermining the characteristic number, and
e) repeating steps a) through d) until the characteristic number trends toward zero or corresponds to a setpoint value.

8. The method as recited in claim 2, wherein the deriving includes the following partial steps:
a) determining a system noise level during the adjusting of the at least one of the two functional units,
b) establishing a threshold that lies above the system noise level,
c) determining a local maximum of the signal that lies above the threshold,
d) restarting the adjusting of the at least one of the two functional units the adjustment with a new local maximum.

9. A regulating device with an adjustment for at least two functional units (1, 2, 3, 4, 6) included in the regulating device, which functional units are configurable using parameterizable eigenvalues, wherein the first functional unit embodies a filter (2) and the second functional unit comprises a proportional branch (1), an integral branch (3), a controlled industrial system (4) and interference variables (6), the device comprising:

calculation means for determining a characteristic number that quantifies a relative deviation between the reactions $y_{Mod}$ and $y_{Sys}$ of the two functional units to a reference variable change when both functional units (1, 2, 3, 4, 6) are excited by the same reference variable change and which, based on the characteristic number, determines a correction factor that is used to parameterize the functional units; and correction means for carrying out a parameterization of the functional units by use of the correction factor in order to reduce the relative deviation, wherein the characteristic number is determined in accordance with one of the following rules:

$$\text{characteristic number} = \frac{\int_{T_0}^{T_0+x \cdot T_f} |\dot{y}_{Mod}| \cdot (y_{Mod} - y_{Sys}) \cdot dt}{\int_{T_0}^{T_0+x \cdot T_f} |\dot{y}_{Sys} \cdot \Delta y_{Sys}| \cdot \text{sgn}(\Delta y_{Sys}) \cdot dt} \text{ or}$$

$$\text{characteristic number} = \frac{\int_{T_0}^{T_0+x \cdot T_f} \dot{y}_{Mod} \cdot (y_{Mod} - y_{Sys}) \cdot dt}{\int_{T_0}^{T_0+x \cdot T_f} \dot{y}_{Sys} \cdot \Delta y_{Sys} \cdot dt} \text{ or}$$

$$\text{characteristic number} = \frac{\int_{0}^{x \cdot T_f} |\dot{y}_{Mod}| \cdot (y_{Mod} - y_{Sys}) \cdot dt}{\int_{0}^{x \cdot T_f} |\dot{y}_{Sys} \cdot y_{Sys}| \cdot \text{sgn}(y_{Sys}) \cdot dt},$$

where $y_{Mod}$ and $_{Sys}$ represent the transient responses of the two functional units to a reference variable change, taken into account over time, the symbol $\dot{y}$ is the time derivative of y, $T_f$ corresponds to an eigenvalue of the low-pass filter (2) that influences a transient response of at least one of the two functional units, x stands for a multiple of the eigenvalue and the equation $\Delta y_{Sys} = y_{Sys} - y_{Sys}(t=0)$ applies where $T_0$ corresponds to a freely selectable starting time.

10. The regulating device as recited in claim 9, further comprising a triggering means for deriving, based on a reference variable change, a signal that is supplied to the regulating device and triggers the start of the adjustment.

11. The regulating device as recited in claim 9, wherein the calculation means determines a nondimensional correction factor; wherein the correction means carries out an iterative change to an eigenvalue of at least one functional unit using the correction factor and continues to process correction values from the calculation means until the deviation trends toward zero or corresponds to a setpoint value.

12. The regulating device as recited in claim 9, further comprising means for deriving a characteristic curve for the characteristic number as a function of the eigenvalues of the functional units (1, 2, 3, 4, 6).

13. The regulating device as recited in claim 12, further comprising storage means in which the characteristic curve is stored and to which the regulating device has access.

14. The regulating device as recited in claim 10, wherein the triggering means determines a system noise level during an adjustment, automatically establishes a threshold as a function of the determined system noise level, determines a local maximum of the signal derived from a reference variable change, and implements the start of the adjustment depending on the determined maximum.

15. The regulating device as recited in claim 9, wherein each functional unit is followed by a filter, and wherein the respective filters have identical filter properties.

16. An electrically operated drive unit, the drive unit equipped with a regulating device as recited in claim 9.

17. A hydraulically operated pressure-controlled cylinder or a speed-controlled cylinder drive unit, the pressure-controlled cylinder or speed-controlled cylinder drive unit equipped with a regulating device as recited in claim 9.

18. A pneumatically operated machine, equipped with a regulating device as recited in claim 9.

19. A hybrid machine, equipped with a regulating device as recited in claim 16.

20. An integrated SPS drive control, equipped with a regulating device as set forth in claim 9, which carries out the method of claim 1 for adjusting the first functional unit and the second functional unit of the regulating device.

* * * * *